United States Patent
Han et al.

(10) Patent No.: US 12,538,049 B2
(45) Date of Patent: Jan. 27, 2026

(54) RAMP SIGNAL GENERATOR, IMAGE SENSOR, AND AUTO-ZERO LEVEL CONTROL METHOD FOR RAMP SIGNALS

(71) Applicant: Samsung Electronics Co., Ltd., Suwon-si (KR)

(72) Inventors: Dongjae Han, Suwon-si (KR); Jaejung Park, Suwon-si (KR); Seunghyun Lim, Suwon-si (KR); Haneul Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 195 days.

(21) Appl. No.: 18/467,318

(22) Filed: Sep. 14, 2023

(65) Prior Publication Data
US 2024/0179434 A1    May 30, 2024

(30) Foreign Application Priority Data
Nov. 29, 2022   (KR) .................... 10-2022-0163447

(51) Int. Cl.
    *H04N 25/78*      (2023.01)
    *H03M 1/56*       (2006.01)
    *H04N 25/59*      (2023.01)
    *H04N 25/616*     (2023.01)

(52) U.S. Cl.
    CPC .......... *H04N 25/78* (2023.01); *H03M 1/56* (2013.01); *H04N 25/59* (2023.01); *H04N 25/616* (2023.01)

(58) Field of Classification Search
    CPC ...... H04N 25/59; H04N 25/616; H04N 25/75; H04N 25/78
    See application file for complete search history.

(56) References Cited

U.S. PATENT DOCUMENTS

| | | |
|---|---|---|
| 8,552,375 B1 | 10/2013 | Aziz et al. |
| 8,729,451 B2 | 5/2014 | Bikumandla |
| 10,498,999 B2 | 12/2019 | Ebihara et al. |
| 2010/0002120 A1 | 1/2010 | Yoshikawa et al. |
| 2010/0208112 A1 | 8/2010 | Lim |
| 2011/0249162 A1 | 10/2011 | Moore |
| 2014/0070974 A1 | 3/2014 | Park et al. |
| 2015/0172580 A1 | 6/2015 | Zhang |
| 2021/0250530 A1* | 8/2021 | Paik .................. H04N 25/78 |
| 2022/0353448 A1* | 11/2022 | Takada .............. H04N 25/78 |
| 2025/0150734 A1* | 5/2025 | Moue ............. H04N 25/7795 |

FOREIGN PATENT DOCUMENTS

CN    113301279 A    8/2021

OTHER PUBLICATIONS

TW Office Action for corresponding Taiwan Patent Application No. 112141392 issued on Jun. 26, 2025.

\* cited by examiner

*Primary Examiner* — Daniel M Pasiewicz

(74) *Attorney, Agent, or Firm* — Harness, Dickey & Pierce, P.L.C.

(57) ABSTRACT

A ramp signal generator may include a current cell unit including a plurality of current sources configured to generate current signals, and a resistance unit connected to an output terminal of the current cell unit. The resistance unit may include a load resistor and an offset resistor connected in series with the load resistor and having a resistance based on analog gains.

8 Claims, 15 Drawing Sheets

RAMP SIGNAL GENERATOR, IMAGE SENSOR, AND AUTO-ZERO LEVEL CONTROL METHOD FOR RAMP SIGNALS

CROSS-REFERENCE TO RELATED APPLICATION

This application is based on and claims priority under 35 U.S.C. § 119 to Korean Patent Application No. 10-2022-0163447, filed on Nov. 29, 2022, in the Korean Intellectual Property Office, the disclosure of which is incorporated by reference herein in its entirety.

BACKGROUND

The inventive concepts relate to a ramp signal generator, an image sensor, and a method of controlling auto-zero levels of ramp signals. More particularly, the inventive concepts relate to a ramp signal generator capable of adjusting the auto-zero levels of ramp signals having different analog gains to be equal to each other.

Image sensors that capture images and convert the images into electrical signals are used in general consumer electronic devices such as digital cameras, mobile phone cameras, and portable camcorders, and also used in cameras of automobiles, security devices, and robots. Image sensors may be classified into a charge coupled device (CCD) type and a complementary metal oxide semiconductor (CMOS) type. CMOS image sensors may include a plurality of pixels that are two-dimensionally arranged.

SUMMARY

The inventive concepts provide a ramp signal generator capable of generating ramp signals having the same auto-zero level regardless of analog gains.

According to an example embodiment of the inventive concepts, there is provided a ramp signal generator.

The ramp signal generator may include a current cell unit including a plurality of current sources configured to generate current signals, and a resistance unit connected to an output terminal of the current cell unit. The resistance unit may include a load resistor and an offset resistor connected in series to the load resistor and having resistance based on analog gains.

According to another example embodiment of the inventive concepts, there is provided an image sensor.

The image sensor may include a pixel array including a plurality of pixels, a ramp signal generator configured to generate ramp signals having different auto-zero levels according to conversion gain modes of the pixel array, and an analog-to-digital conversion circuit configured to output a comparison signal by comparing a ramp signal with a signal output from the pixel array. The ramp signal generator may be configured to generate a first ramp signal having a first auto-zero level based on a first gain, and a second ramp signal having a second auto-zero level based on a second gain. The ramp signal generator may be configured to adjust the auto-zero level of the first ramp signal and the auto-zero level of the second ramp signal to be equal to each other.

According to another example embodiment of the inventive concepts, there is provided a method of controlling auto-zero levels of ramp signals.

The method may be for controlling a first auto-zero level of a first ramp signal having a first gain and a second auto-zero level of a second ramp signal having a second gain lower than the first gain to adjust the first auto-zero level of the first ramp signal and the second auto-zero level of the second ramp signal to be equal to each other. The method may include performing primary matching on the first ramp signal to match a level of the first ramp signal to a highest level of the second ramp signal and performing secondary matching on the second ramp signal to match the second auto-zero level of the second ramp signal to an auto-zero level of the primarily-matched first ramp signal.

BRIEF DESCRIPTION OF THE DRAWINGS

Example embodiments will be more clearly understood from the following detailed description taken in conjunction with the accompanying drawings in which.

DETAILED DESCRIPTION OF THE EXMAPLE EMBODIMENTS

Hereinafter, various example embodiments will be described with reference to the accompanying drawings.

Figure 1:
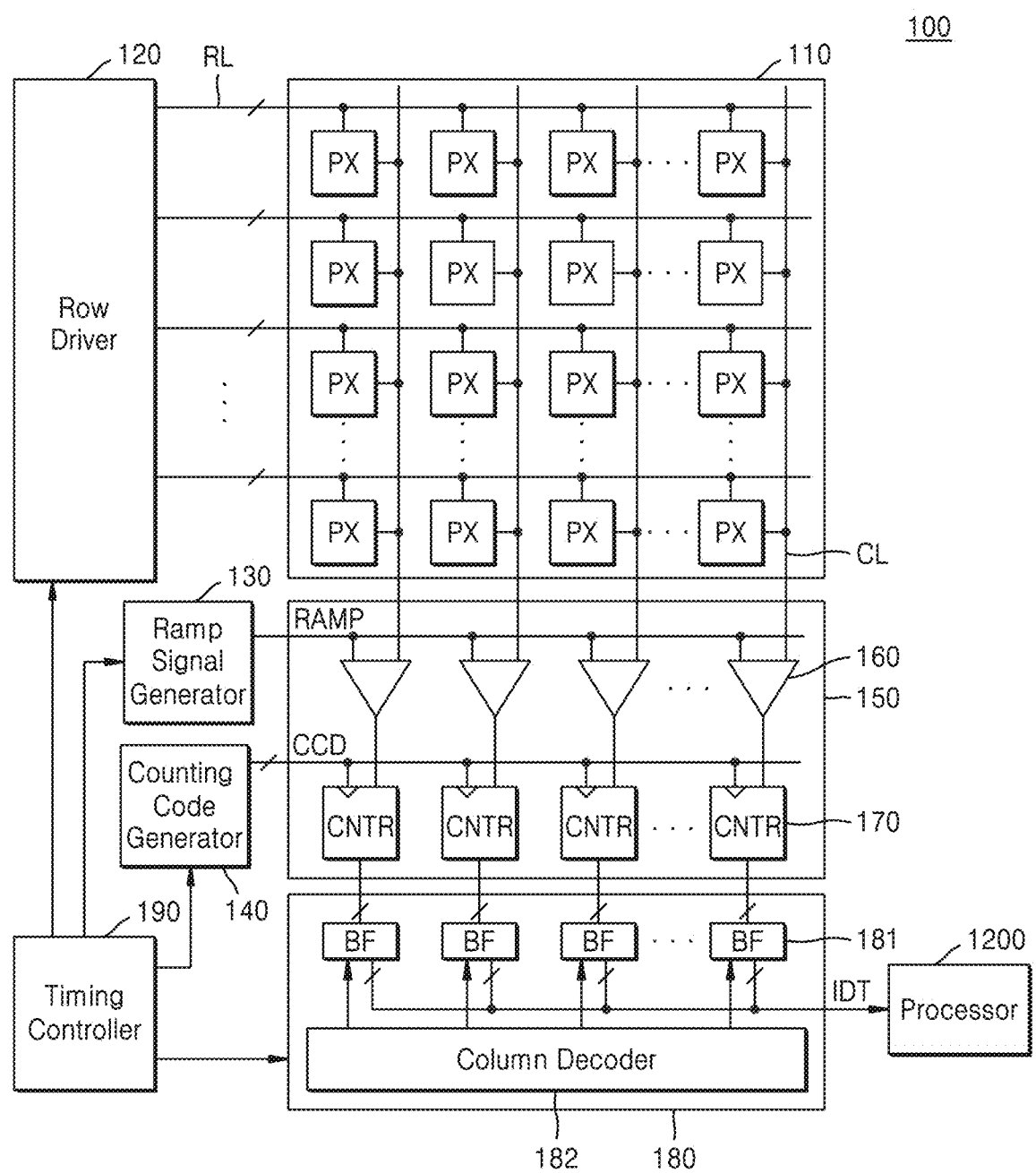
FIG. 1 is a block diagram of an image sensor according to an example embodiment.

FIG. 1 is a block diagram illustrating an image sensor 100 according to an example embodiment. The image sensor 100 of the example embodiment may be a complementary metal oxide semiconductor image sensor (CIS) configured to convert an optical signal into an electrical signal.

Referring to FIG. 1, the image sensor 100 may include a pixel array 110, a row driver 120, a ramp signal generator 130, a counting code generator 140, an analog-to-digital conversion (ADC) circuit 150, a data output circuit 180, and a timing controller 190. A structure including the ADC circuit 150 and the data output circuit 180 may be referred to as a readout circuit. The pixel array 110 may include a plurality of row lines RL, a plurality of column lines CL, and a plurality of pixels PX. The plurality of pixels PX may be connected to the plurality of row lines RL and the plurality of column lines CL, and may be arranged in a matrix.

Each (or alternatively, at least one) of the plurality of pixels PX of the pixel array 110 may include at least one photoelectric conversion element to sense light by using the photoelectric conversion element and output as an image signal, an electrical signal sensed according to the light. For example, the photoelectric conversion element may include a photodiode, a phototransistor, a photogate, a pinned photodiode, or the like. In the present disclosure, it is assumed that the photoelectric conversion element is a photodiode.

A micro-lens (not shown) configured to condense light may be disposed on an upper side of each (or alternatively, at least one) of the plurality of pixels PX or each group of adjacent pixels PX. When light is incident on each (or alternatively, at least one) of the plurality of pixels PX through the micro-lens disposed there-above, each (or alternatively, at least one) of the plurality of pixels PX may sense the light in a specific spectrum region. A color filter array for transmitting light in a specific spectrum region may be disposed on the plurality of pixels PX, and the plurality of pixels PX may detect colors depending on color filters respectively disposed on the plurality of pixels PX.

In the pixel array 110 of the current example embodiment, each pixel PX may have a dual conversion gain (DCG). The DCG includes a low conversion gain (LCG) and a high conversion gain (HCG). Herein, the term "conversion gain" refers to a rate at which charge accumulated in a floating diffusion node FD (refer to FIG. 2) is converted into a voltage. Charge generated by a photoelectric conversion element PD (refer to FIG. 2) may be transferred to and accumulated in the floating diffusion node FD, and the charge accumulated in the floating diffusion node FD may be converted into a voltage according to a conversion gain. In this case, the conversion gain may vary according to the capacitance of the floating diffusion node FD. The conversion gain may decrease as the capacitance increases and may increase as the capacitance decreases.

The pixel PX may operate in an LCG mode in which the capacitance of the floating diffusion node FD is high or an HCG mode in which the capacitance of the floating diffusion node FD is low, and even when charge accumulated in the floating diffusion node FD is the same, the voltage of the floating diffusion node FD may be higher in the HCG mode than in the LCG mode. Elements and operations of each (or alternatively, at least one) of the plurality of pixels PX will be described later according to conversion modes with reference to FIG. 2.

A dark area may be vividly expressed in a first piece of image data generated when the plurality of pixels PX of the pixel array 110 operate in the HCG mode, and a bright area may be vividly expressed in a second piece of image data generated when the plurality of pixels PX of the pixel array 110 operate in the LCG mode.

According to an example embodiment, each (or alternatively, at least one) of the plurality of pixels PX may continuously operate in the HCG mode and the LCG mode during a corresponding readout period within one frame in which the pixel array 110 is scanned, and thus, both the first piece of image data and the second piece of image data may be generated in a one-frame period. The first piece of image data and the second piece of image data may be merged to generate a 1-shot image having a high dynamic range (HDR) in which bright areas (high-illumination areas) and dark area (low-illumination areas) are vividly implemented. As described above, a DCG within one frame may be referred to as an intra-scene DCG.

The row driver 120 drives the pixel array 110 in units of rows. The row driver 120 may decode a row control signal (for example, an address signal) received from the timing controller 190 and may select at least one row line from the plurality of row lines RL of the pixel array 110 in response to the decoded row control signal. For example, the row driver 120 may generate a selection signal for selecting one of a plurality of rows. The pixel array 110 may output a pixel signal, for example, a pixel voltage, from a row selected based on a selection signal provided from the row driver 120. The pixel signal may include a reset signal and an image signal. The row driver 120 may transmit control signals for outputting pixel signals to the pixel array 110, and the plurality of pixels PX may output pixel signals while operating in response to the control signals.

The ramp signal generator 130 may generate a ramp signal RAMP (for example, a ramp voltage) having a level increasing or decreasing with a given slope under control by the timing controller 190. The magnitude of generated current may be determined to determine a digital value corresponding to a digital pixel signal. A reference signal is required or desired to determine the magnitude of the generated current by comparing the generated current with the reference signal. The reference signal may be a ramp signal RAMP. A section in which the magnitude of the generated current is included is determined by comparing the magnitude of the generated current with the level of the ramp signal RAMP. The ramp signal RAMP may be provided to each (or alternatively, at least one) of a plurality of CDS circuits 160 included in the ADC circuit 150.

In some example embodiments, the ramp signal generator 130 may include: an offset resistor capable of adjusting an auto-zero level according to an analog gain; and a current cell unit capable of varying an auto-zero level of a ramp signal RAMP. According to the ramp signal generator 130 of the inventive concepts, even when an analog gain is varied, the same auto-zero level may be obtained, and thus readout operations may be performed while varying the analog gain within a one horizontal scanning time (1H-period). The term "1H-period" may refer to a time period required (or alternatively, used) for the row driver 120 to scan one row. The ramp signal generator 130 of the inventive concepts may match an auto-zero level with a signal to be input to the plurality of CDS circuits 160.

The counting code generator 140 may generate a counting code CCD under control by the timing controller 190. The counting code CCD may be provided to each (or alternatively, at least one) of a plurality of counter circuits 170. In some example embodiments, the counting code generator 140 may be implemented as a gray code generator. The counting code generator 140 may generate, as the counting code CCD, a plurality of code values having a resolution according to a set number of bits. For example, when a 10-bit code is set, the counting code generator 140 may generate a counting code CCD including sequentially ascending or descending 1024 code values.

The ADC circuit 150 may include the plurality of CDS circuits 160 and the plurality of counter circuits 170. The ADC circuit 150 may convert a pixel signal (for example, a pixel voltage) received from the pixel array 110 into a pixel value that is a digital signal. Each pixel signal received through each (or alternatively, at least one) of the plurality of column lines CL may be converted into a pixel value that is a digital signal by a CDS circuit 160 and a counter circuit 170.

The CDS circuit 160 may compare a pixel signal, for example, a pixel voltage, received through a column line CL with a ramp signal RAMP and may output results of the comparison as a comparison signal. When the level of the ramp signal RAMP is the same as the level of the pixel signal, the CDS circuit 160 may output a comparison signal that transitions from a first level (for example, a logic high level) to a second level (for example, a logic low level). A time point at which the level of the comparison signal transitions may be determined according to the level of the pixel signal.

The CDS circuit 160 may sample a pixel signal provided from a pixel PX according to a CDS scheme. The CDS circuit 160 may sample a reset signal received as a pixel signal and may compare the reset signal with the ramp signal RAMP to generate a comparison signal according to the reset signal. Thereafter, the CDS circuit 160 may sample an image signal correlated to the reset signal and may compare the image signal with the ramp signal RAMP to generate a comparison signal according to the image signal.

The counter circuit 170 may count level transition time points of the comparison signal output from the CDS circuit 160 and may output a count value. In some example embodiments, the counter circuit 170 may include a latch circuit and a calculation circuit. The latch circuit may receive the counting code CCD from the counting code generator 140 and the comparison signal from the CDS circuit 160 and may latch a code value of the counting code CCD at a time point when the level of the comparison signal transitions. The latch circuit may latch each (or alternatively, at least one) of a code value, for example, a reset value, corresponding to a reset signal and a code value, for example, an image signal value, corresponding to an image signal. The calculation circuit may calculate the reset value and the image signal value to generate an image signal value from which a reset level of the pixel PX is removed. The counter circuit 170 may output, as a pixel value, the image signal value from which the reset level is removed.

The data output circuit 180 may temporarily store a pixel value output from the ADC circuit 150 and may then output the pixel value. The data output circuit 180 may include a plurality of column memories 181 and a column decoder 182. The plurality of column memories 181 store pixel values received from the counter circuits 170. In some example embodiments, the plurality of column memories 181 may be respectively included in the plurality of counter circuits 170. A plurality of pixel values stored in the plurality of column memories 181 may be output as image data IDT under control by the column decoder 182.

The timing controller 190 may output control signals to each (or alternatively, at least one) of the row driver 120, the ramp signal generator 130, the counting code generator 140, the ADC circuit 150, and the data output circuit 180 to control operations or timings of the row driver 120, the ramp signal generator 130, the counting code generator 140, the ADC circuit 150, and the data output circuit 180.

A processor 1200 connected to the image sensor 100 may perform, on image data, noise reduction processing, gain control, waveform shaping processing, interpolation processing, white balance processing, gamma processing, edge enhancement processing, binning, or the like. In some example embodiments, the processor 1200 may be provided inside the image sensor 100.

The image sensor 100 of the inventive concepts may convert incident light into an image signal. The image sensor 100 of the inventive concepts may be included in an electronic device (not shown). For example, the image sensor 100 of the inventive concepts may be included in an electronic device having an image or light sensing function. For example, the electronic device may include at least one of a camera, a smartphone, a wearable device, an Internet of things (IoT) device, a tablet personal computer (PC), a personal digital assistant (PDA), a portable multimedia player (PMP), or a navigation device. For example, the electronic device may a component of vehicles, furniture, manufacturing facilities, doors, various measurement instruments, or the like.

Figure 2:
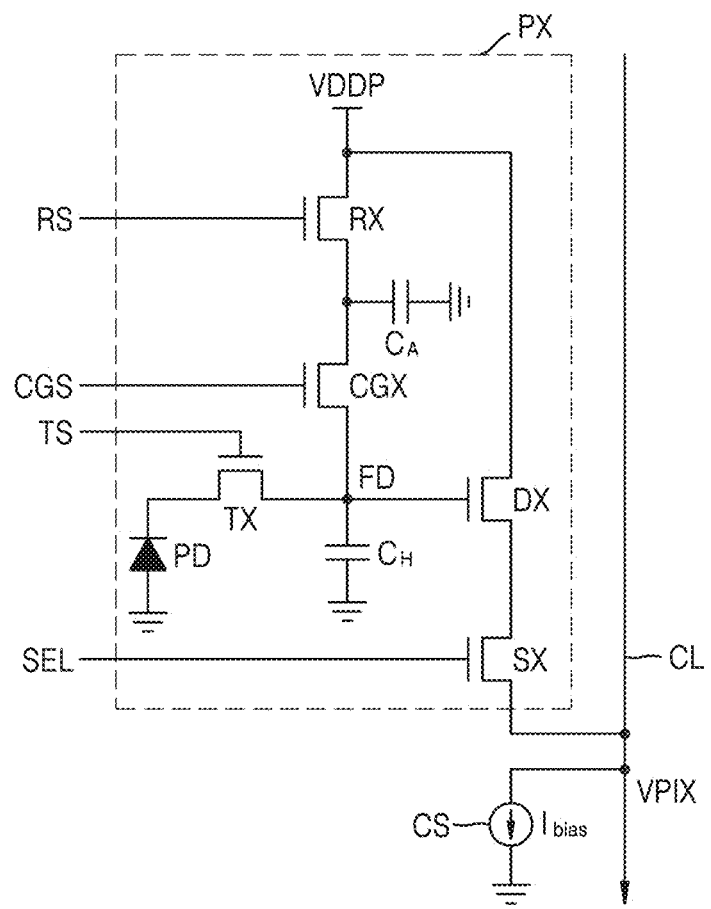
FIG. 2 is a circuit diagram illustrating a pixel according to an example embodiment.

FIG. 2 is a circuit diagram illustrating a pixel PX according to an example embodiment.

The pixel PX may include a photodiode PD, a plurality of transistors, such as a transport transistor TX, a reset transistor RX, a driving transistor DX, a selection transistor SX, and a gain control transistor (or a conversion gain control transistor) CGX, and a capacitor $C_A$. A capacitor CH, for example, a parasitic capacitor, may be formed by the floating diffusion node FD. The capacitor $C_A$ may be a passive element having a fixed or variable capacitance, a parasitic capacitor formed by a source/drain of the gain control transistor CGX, or a parasitic capacitor formed in another pixel PX that may be connected to the source/drain of the gain control transistor CGX.

The photodiode PD may convert light incident from the outside of the pixel PX into an electrical signal. The photodiode PD may generate a charge according to the intensity of the incident light. The amount of charge generated by the photodiode PD depends on an image capturing environment (a low-illumination or high-illumination environment). For example, the amount of charge generated by the photodiode PD in a high-illumination environment may reach the full well capacity (FWC) of the photodiode PD. However, the amount of charge generated by the photodiode PD may not reach the FWC of the photodiode PD in a low-illumination environment.

The transport transistor TX, the reset transistor RX, the driving transistor DX, the selection transistor SX, and the gain control transistor CGX may operate respectively in response to control signals, for example, a reset control signal RS, a transport control signal TS, a selection signal SEL, and a gain control signal CGS, provided from the row driver 120.

The reset transistor RX may be turned on in response to the reset control signal RS applied to a gate terminal of the reset transistor RX such that the floating diffusion node FD may be reset based on a pixel power supply voltage VDDP. In this case, the gain control transistor CGX may also be turned on based on the gain control signal CGS applied to a gate terminal of the gain control transistor CGX such that the pixel power supply voltage VDDP may be applied to the floating diffusion node FD, thereby resetting the floating diffusion node FD.

The transport transistor TX may be turned on in response to the transport control signal TS applied to a gate terminal of the transport transistor TX such that charge generated by the photodiode PD may be transported to the floating diffusion node FD. Thus, charge may be accumulated in the floating diffusion node FD. In other words, charge may be accumulated in the capacitor CH formed by the floating diffusion node FD, or when the gain control transistor CGX is turned on, charge may be accumulated in the capacitor CH and the capacitor $C_A$.

The charge accumulated in the floating diffusion node FD may generate a voltage. In other words, the charge accumulated in the floating diffusion node FD may be converted into a voltage. A conversion gain may be determined by the capacitance of the floating diffusion node FD and may be inversely proportional to the capacitance of the floating diffusion node FD. The unit of the conversion gain may be, for example, μV/e. When the capacitance of the floating diffusion node FD increases, the conversion gain decreases, and when the capacitance of the floating diffusion node FD decreases, the conversion gain increases.

The driving transistor DX may operate as a source follower based on a bias current $I_{bias}$ generated by a current source CS connected to a column line CL and may output, through the selection transistor SX, a voltage corresponding to the voltage of the floating diffusion node FD as a pixel voltage VPIX.

The selection transistor SX may select the pixel PX. The selection transistor SX may be turned on in response to the selection signal SEL applied to a gate terminal of the selection transistor SX such that the pixel voltage VPIX (or a pixel current) output from the driving transistor DX may be output to the column line CL. The pixel voltage VPIX may be provided to the ADC circuit 150 (refer to FIG. 1) through the column line CL.

The gain control transistor CGX may be turned on or off based on the gain control signal CGS applied to the gate terminal of the gain control transistor CGX. When the gain control transistor CGX is turned off, the floating diffusion node FD has a capacitance value by the capacitor CH. When the gain control transistor CGX is turned on, the capacitor $C_A$ is connected to the floating diffusion node FD, and the floating diffusion node FD has a capacitance value by the capacitor CH and the capacitor $C_A$ such that the capacitance of the floating diffusion node FD may increase. A conversion gain when the gain control transistor CGX is turned off may be higher than a conversion gain when the gain control transistor CGX is turned on. A state in which the gain control transistor CGX is turned off may be referred to as the HCG mode, and a state in which the gain control transistor CGX is turned on may be referred to as the LCG mode.

As described above, the pixel PX may operate in either the HCG mode or the LCG mode depending on whether the gain control transistor CGX is turned on or off. In the HCG mode, the conversion gain of the pixel PX may increase, and thus, the gains of circuits (for example, the ADC circuit 150) configured to process the pixel voltage VPIX output from the pixel PX may relatively decrease. Therefore, the signal to noise ratio (SNR) of the image sensor 100 (refer to FIG. 1) may increase such that the minimal sensible light amount of the image sensor 100 may decrease, and thus the small-light-amount sensing performance of the image sensor 100 may be improved. In the LCG mode, the capacitance of the floating diffusion node FD of the pixel PX is high, and thus, the FWC of the photodiode PD may increase. Therefore, the large-light-amount sensing performance of the image sensor 100 may be improved.

As described above, because the pixel PX has a DCG, the pixel PX may be capable of sensing a small amount of light and a large amount of light. Thus, the dynamic range of the image sensor 100 may be widened (or increased). For example, different analog gains may be used in the HCG mode or the LCG mode. For example, the ramp signal generator 130 may adjust the auto-zero levels of ramp signals having different analog gains in the HCG mode or the LCG mode to be equal to each other (described later).

Figure 3:
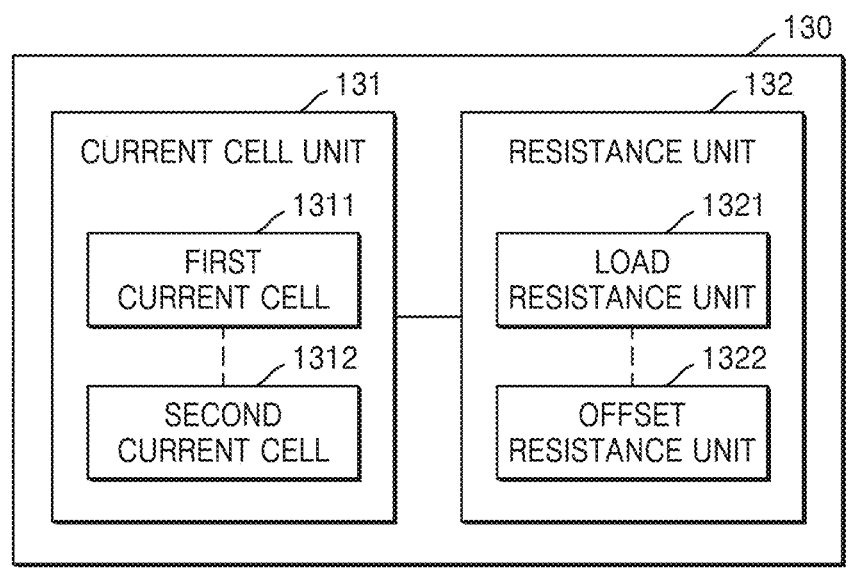
FIG. 3 is a block diagram schematically illustrating a configuration of a ramp signal generator according to an example embodiment.

FIG. 3 is a block diagram schematically illustrating a configuration of the ramp signal generator 130 according to an example embodiment.

Referring to FIG. 3, the ramp signal generator 130 may include a current cell unit 131 and a resistance unit 132. The current cell unit 131 may include a first current cell 1311 and a second current cell 1312. The first current cell 1311 and the second current cell 1312 may include current sources capable of generating current. Each (or alternatively, at least one) of the first current cell 1311 and the second current cell 1312 may include a plurality of current sources. In the example embodiment shown in FIG. 3, the first current cell 1311 and the second current cell 1312 of the current cell unit 131 may be current cells configured to provide current for different purposes. For example, the first current cell 1311 may include at least one current source for generating a reference current, and the second current cell 1312 may include at least one current source for controlling an auto-zero level. Current generated by the first current cell 1311 may be referred to a current signal for counting.

The resistance unit 132 may include a load resistance unit 1321 and an offset resistance unit 1322. The load resistance unit 1321 may include a load resistor, and the offset resistance unit 1322 may include an offset resistor. For example, the offset resistance unit 1322 may include a variable resistor.

According to an example embodiment, auto-zero levels of ramp signals generated by the ramp signal generator 130 may be controlled to be equal to each other by controlling the second current cell 1312 of the current cell unit 131 and the offset resistance unit 1322 of the resistance unit 132.

Figure 4:
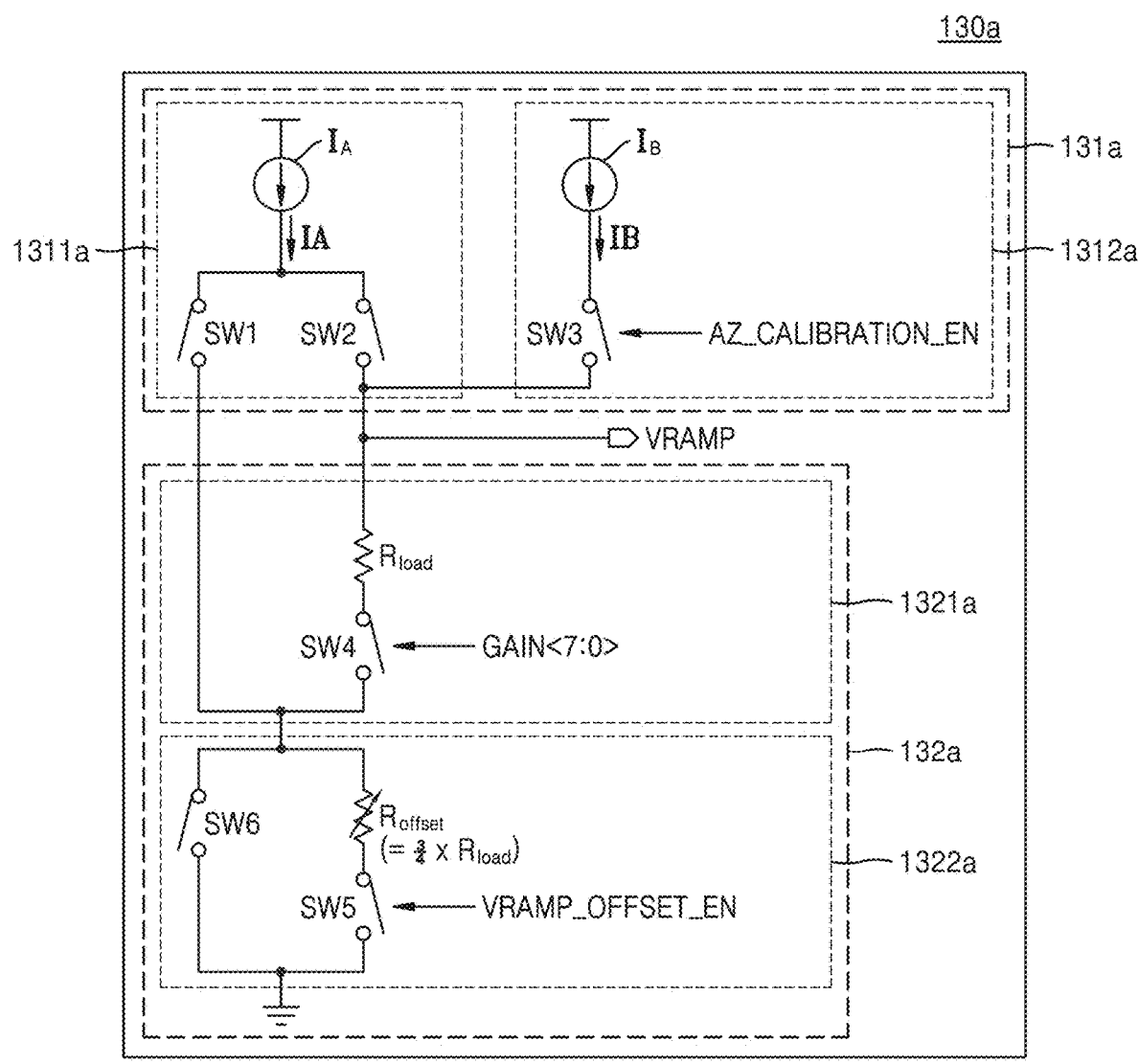
FIG. 4 is a circuit diagram illustrating a ramp signal generator according to an example embodiment.

FIG. 4 is a circuit diagram illustrating a ramp signal generator 130a according to an example embodiment. FIG. 4 may be an example view in which a block diagram of the ramp signal generator 130 shown in FIG. 3 is illustrated in the form of a circuit diagram. Referring to FIG. 4, the ramp signal generator 130a may include a current cell unit 131a and a resistance unit 132a. The current cell unit 131a may include a first current cell 1311a and a second current cell 1312a.

In the example shown in FIG. 4, each (or alternatively, at least one) of the first current cell 1311a and the second current cell 1312a includes only one current source $I_A$ or $I_B$. However, this is merely an example in which only one current source is shown for ease of illustration. In some example embodiments, each (or alternatively, at least one) of the first current cell 1311a and the second current cell 1312a may include a plurality of current sources, and each (or alternatively, at least one) of the plurality of current sources may generate the same amount of current. In the example shown in FIG. 4, for ease of illustration, it is assumed that the amount of current generated by the first current cell 1311a is I*A, and the amount of current generated by the second current cell 1312a is I*B. In an example, when it is assumed that current generated by one current source is I, the number of current sources included in the first current cell 1311a may be A, and the number of current sources included in the second current cell 1312a may be B. In FIG. 4, for ease of illustration, it is illustrated that one current source $I_A$ included in the first current cell 1311a generates current in an amount of I*A, and one current source $I_B$ included in the second current cell 1312a generates current in an amount of I*B. That is, it may be understood that the current sources $I_A$ and $I_B$ in FIG. 4 may respectively include A current sources and B current sources each capable of generating current I.

Referring to FIG. 4, the current cell unit 131a may further include a plurality of switches SW1, SW2, and SW3. Referring to FIG. 4, the current cell unit 131a may include a first switch SW1 and a second switch SW2 that are connected to the current source $I_A$ of the first current cell 1311a. The first switch SW1 connected to the current source $I_A$ of the first current cell 1311a may be a switch for connection to a path to ground. The second switch SW2 connected to the current source $I_A$ of the first current cell 1311a may be a switch for connection to a load resistor $R_{load}$ of the resistance unit 132a. The first switch SW1 and the second switch SW2 may be connected in parallel to each other. Referring to FIG. 4, the current cell unit 131a may include the third switch SW3 connected to the current source $I_B$ of the second current cell 1312a. An end of the second switch SW2 and an end of the third switch SW3 may be electrically connected to each other. The third switch SW3 may be turned on or off by an auto-zero calibration signal AZ_CALIBRATION_EN. In an example, the third switch SW3 may be turned on when trying to match the auto-zero level of a ramp signal having a low gain to the auto-zero level of a ramp signal having a high gain. In the present disclosure, it is described that the ramp signal has an auto-zero level and a gain value, but this can be interpreted to mean "the ramp signal has an auto-zero level based on the gain value.

Referring to FIG. 4, the resistance unit 132a may include a load resistance unit 1321a having the load resistor $R_{load}$, and an offset resistance unit 1322a having an offset resistor $R_{offset}$. The load resistance unit 1321a and the offset resistance unit 1322a may be connected in series to each other. The load resistor unit 1321a may include the load resistor $R_{load}$ and a fourth switch SW4 connected in series to the load resistor $R_{load}$. The load resistor $R_{load}$ may be electrically connected to contacts of the second switch SW2 and the third switch SW3. The fourth switch SW4 may be turned on or off by a gain control signal GAIN<7:0>. The offset resistance unit 1322a may include the offset resistor $R_{offset}$ and a fifth switch SW5 connected in series to the offset resistor $R_{offset}$. The fifth switch SW5 may be turned on or off by a resistance offset signal VRAMP_OFFSET_EN. The offset resistance unit 1322a may include a sixth switch SW6 connected in parallel to the fifth switch SW5 and the offset resistor $R_{offset}$. According to an example, the fifth switch SW5 may be a switch for connection to the offset resistor $R_{offset}$. The sixth switch SW6 may be a switch for connection to ground. According to an example, the fifth switch SW5 may be turned on when trying to match the auto-zero level of a ramp signal having a high gain to the auto-zero level of a ramp signal having a low gain.

In FIG. 4, the analog gain of the ramp signal generator 130a, that is, the slope of a ramp signal, may be adjusted by varying the resistance of the load resistor $R_{load}$ in a situation in which constant ramp current flows. A ramp signal may be ramped by turning on or off a plurality of current cells of the current cell unit 131a one by one. Control signals (including AZ_CALIBRATION_EN, GAIN<7:0>, and VRAMP_OFFSET_EN) for controlling each of the first to sixth switches SW1-SW6 may be generated and transmitted by the timing controller 190.

The example shown in FIG. 4 may be an example circuit for matching the auto-zero level of a ramp signal having a gain of 1× with the auto-zero level of a ramp signal having a gain of 4×. According to an example embodiment, in the example shown in FIG. 4, the resistance of the offset resistor $R_{offset}$ may be ¾ of the resistance of the load resistor $R_{load}$ $$(R_{offset} = \frac{3}{4} R_{load}).$$

The resistance of the offset resistor $R_{offset}$ may vary, for example, depending on the multiple of the gain of a ramp signal of which the auto-zero level is to be adjusted. The resistance of the offset resistor $R_{offset}$ may be varied by a control signal the timing controller 190.

In an example, it is assumed that load resistance for a ramp signal having a gain of 1× is $R_{load}$. In this case, the sixth switch SW6 may be turned on to disconnect the offset resistor $R_{offset}$, and the total resistance of a circuit of the ramp signal generator 130a may be $R_{load}$. In an example, load resistance for a ramp signal having a gain of 4× may $$\frac{R_{load}}{4}.$$

Therefore, the auto-zero level of the ramp signal having a gain of 4× may be $$\frac{1}{4}$$

of the auto-zero level of the ramp signal having a gain of 1×.

Therefore, to match the auto-zero level of the ramp signal having a gain of 4× to the auto-zero level of the ramp signal having a gain of 1×, the resistance of the offset resistor $R_{offset}$ may be additionally adjusted to obtain a load resistance value corresponding to a gain of 1×. Therefore, to satisfy $R_{load}$ which is a load resistance value for a gain of 1×, as much offset resistance as $$\frac{3}{4} R_{load}$$

may be added to adjust a resistance value for a gain of 1× and a resistance value for a gain of 4× to be equal to each other, thereby accomplishing primary matching for auto-zero leveling. In the present disclosure, the term "primary matching" may refer to matching the auto-zero level of a ramp signal having a high gain to the auto-zero level of a ramp signal having a low gain.

Although the maximum level (or alternatively, a highest level or a high level) of a ramp signal having a gain of 1× may be matched to the maximum level (or alternatively, a highest level or a high level) of a ramp signal having a gain of 4× by primary matching, the auto-zero levels of the two ramp signals may still be different from each other. In this case, additional matching may be performed to equalize the auto-zero levels of the two ramp signals by adding a current using the current source $I_B$ of the second current cell 1312a. This will be further described through the example embodiment shown in FIG. 5.

Figure 5:
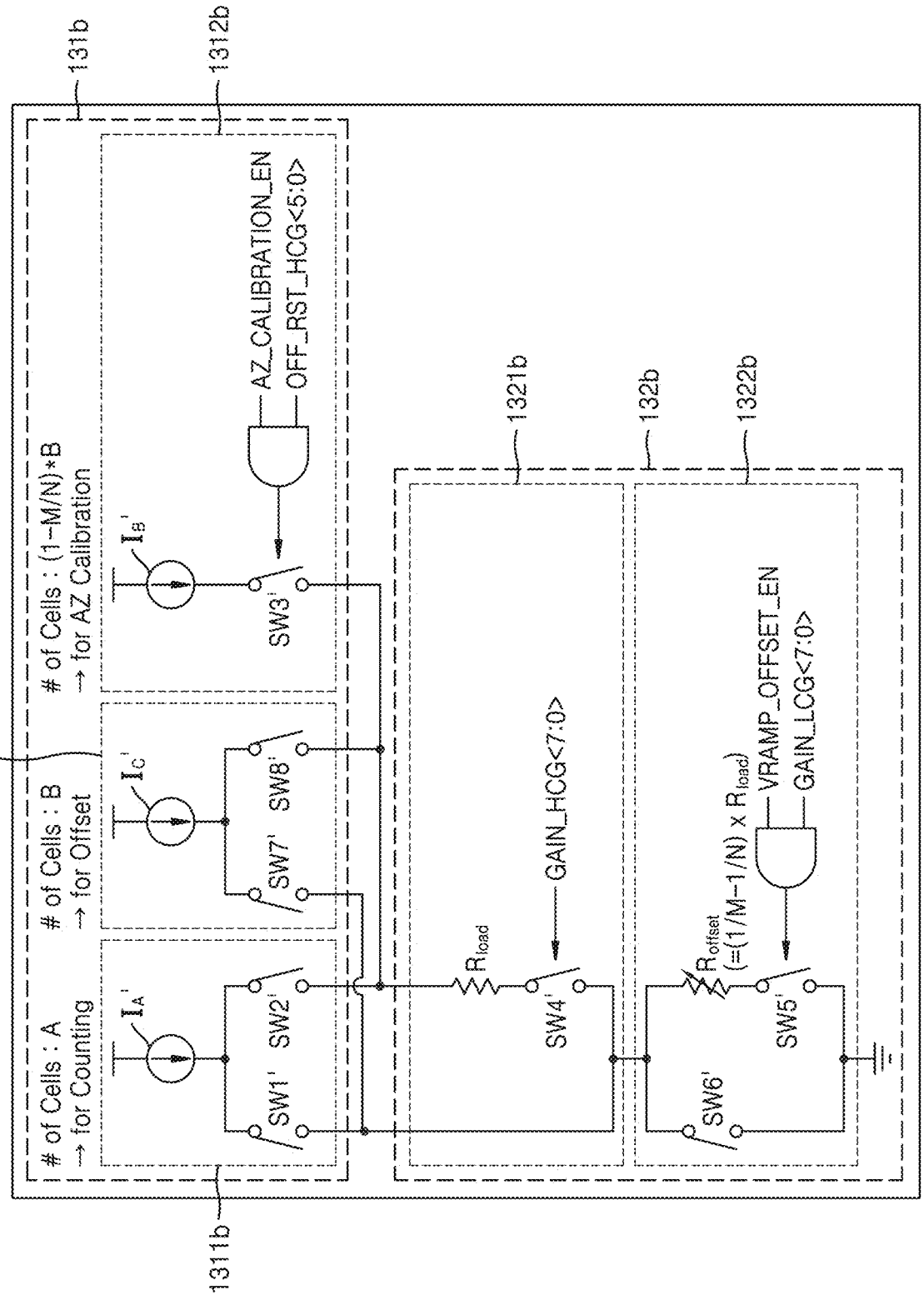
FIG. 5 is a circuit diagram illustrating a ramp signal generator according to an example embodiment.

FIG. 5 is a circuit diagram illustrating a ramp signal generator 130b according to an example embodiment. In the following description of the example embodiment shown in FIG. 5, those described with reference to FIG. 4 will not be described again.

Referring to FIG. 5, the ramp signal generator 130b may include a current cell unit 131b and a resistance unit 132b. According to an example, the current cell unit 131b may include a plurality of current cells, for example, first to third current cells 1311b, 1312b, and 1313b. According to an example, the first current cell 1311b may include a current source $I_A'$, a first switch SW1', and a second switch SW2'. The second current cell 1312b may include a current source $I_B'$, and a third switch SW3'. The third current cell 1313b may include a current source $I_C'$, a seventh switch SW7', and an eighth switch SW8'.

According to an example, a signal, which is output from an AND gate to which an auto-zero calibration signal AZ_CALIBRATION_EN and a first offset reset signal OFF_RST_HCG<5:0> are applied, may be applied to the third switch SW3'.

According to an example, the first current cell 1311*b* shown in FIG. 5 may correspond to the first current cell 1311*a* shown in FIG. 4. The second current cell 1312*b* shown in FIG. 5 may correspond to the second current cell 1312*a* shown in FIG. 4. The third current cell 1313*b* shown in FIG. 5 may be a reference current cell for determining the number of current sources included in the second current cell 1312*b*. The first current cell 1311*b* may be used in a counting period, and the second current cell 1312*b* and the third current cell 1313*b* may be used to determine the auto-zero level of a ramp signal.

According to an example, the number of current sources included in the first current cell 1311*b* may be A. According to an example, the number of current sources included in the third current cell 1313*b* may be B. According to an example, B may refer to the number of current sources to be turned off to drop a ramp signal from a maximum level (or alternatively, a highest level or a high level) to an auto-zero level when the first offset reset signal OFF_RST_HCG<5:0> or a second offset reset signal OFF_RST_LCG<5:0> is applied. According to an example, the number of current sources included in the second current cell 1312*b* may be $$\left(1 - \frac{M}{N}\right) * B.$$

That is, to correct the auto-zero level of a ramp signal having a low analog gain, $$\left(1 - \frac{M}{N}\right) * B$$

current sources may be additionally required or desired. In this case, M may refer to a low analog gain value (multiple) in an LCG mode, and N may refer to a high analog gain value (multiple) in an HCG mode. According to an example, A, B, N, and M may be natural numbers. In this case, the amount of current required (or alternatively, used) for each current source to generate may be the same in the first current cell 1311*b*, the second current cell 1312*b*, and the third current cell 1313*b*. Although the auto-zero level of a ramp signal varies according to an analog gain, the auto-zero level of a ramp signal may be varied according to the resistance of a load resistor $R_{load}$ included in the ramp signal generator 130*b*, and the number of current sources may be maintained constant. Therefore, the first offset reset signal OFF_RST_HCG<5:0>, which is a signal for adjusting the number of current sources, may be fixed. According to an example, the same offset level may be used in the LCG mode and the HCG mode, and thus the first offset reset signal OFF_RST_HCG<5:0> and the second offset reset signal OFF_RST_LCG<5:0> may be the same.

In the example embodiment shown in FIG. 4, a low analog gain may be 1×, and a high analog gain may be 4×. Therefore, in the example embodiment shown in FIG. 4, M may be 1 and N may be 4.

The resistance of the load resistor $R_{load}$ may be adjusted by an HCG control signal GAIN_HCG<7:0>, and in the LCG mode, an LCG control signal GAIN_LCG<7:0> may be used. A load resistance unit 1321*b* shown in FIG. 5 may correspond to the load resistance unit 1321*a* shown in FIG. 4.

The resistance of an offset resistor $R_{offset}$ may be expressed by the following equation using an analog gain. That is, $$R_{offset} = \left(\frac{1}{M} - \frac{1}{N}\right) * R_{load}.$$

According to an example embodiment, the resistance of an offset resistance unit 1322*b* including the offset resistor $R_{offset}$ may be $$\left(\frac{1}{M} - \frac{1}{N}\right)$$

times the resistance of the load resistance unit 1321*b* including the load resistor $R_{load}$, and a signal for adjusting the number of corresponding units may be adjusted by the number of LCG control signals GAIN_LCG<7:0>. The offset resistance unit 1322*b* shown in FIG. 5 may correspond to the offset resistance unit 1322*a* shown in FIG. 4. According to an example, a signal, which is output from an AND gate to which a resistance offset signal VRAMP_OFFSET_EN and an LCG control signal GAIN_LCG<7:0> are applied, may be applied to a fifth switch SW5'.

For example, it may be assumed that one unit of the load resistor $R_{load}$ has a resistance of 100Ω. In this case, when the LCG control signal GAIN_LCG<7:0> is set for connection of one unit resistor at an analog gain of 1×, load resistance may be 100 Ω at an analog gain of 1×. The HCG control signal GAIN_HCG<7:0> may be set for parallel connection of four unit load resistors at an analog gain of 4×, and in this case, load resistance may be 25Ω. When an auto-zero level is adjusted using the offset resistor $R_{offset}$ at an analog gain of 4×, the resistance of one unit of the offset resistor $R_{offset}$ may be $$\left(\frac{1}{1} - \frac{1}{4}\right),$$

that is, $$\frac{3}{4},$$

of the resistance of one unit of the load resistor $R_{load}$ and is thus 75Ω. In this case, the LCG control signal GAIN_LCG<7:0> indicates connection of one unit of the offset resistor $R_{offset}$, and thus offset resistance may be 75Ω.

FIGS. 3 to 5 illustrate configurations of the ramp signal generators 130, 130*a*, and 130*b* according to some example embodiments. According to some example embodiments, a ramp signal generator may generate ramp signals having different analog gains depending on whether a pixel array operates in an HCG mode or an LCG mode. Because a load resistance value for a ramp signal having a high analog gain is less than a load resistance value for a ramp signal having a low analog gain, it may be necessary to compensate for the difference without changing a ramp signal slope. Offset resistance corresponding to the difference from the load resistance for a ramp signal having a low analog gain may be added to adjust the output of a ramp signal having a high analog gain. In this case, the amount to be adjusted by the offset resistance may be determined based on the maximum level (or alternatively, a highest level or a high level) of the ramp signal having a low analog gain. Therefore, it is needed (or desired) to additionally adjust the auto-zero levels of the ramp signals. As a method for additional adjustment, a second current cell for auto-zero calibration (AZ Calibration) may be added to increase the auto-zero level of the ramp signal having a low analog gain. In this manner, the auto-zero levels of ramp signals having different analog gains may be adjusted to be equal to each other. This will be further described with reference to graphs shown in FIGS. 6A to 6C.

Figure 6A:
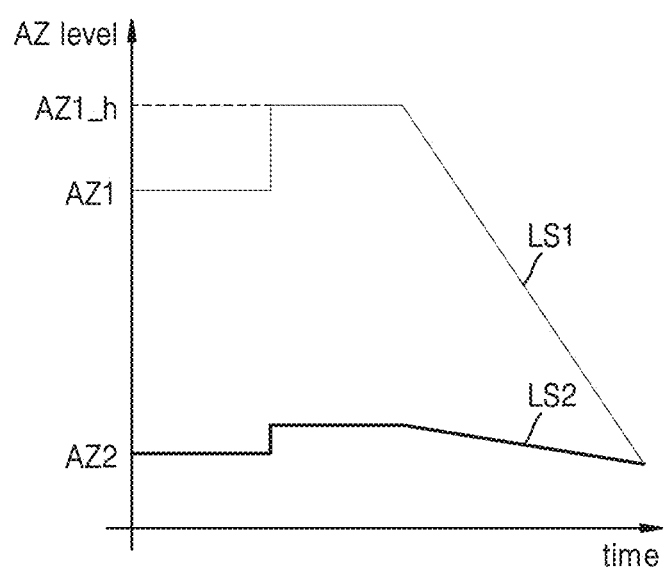
FIGS. 6A to 6C are graphs illustrating an example in which a ramp signal generator adjusts auto-zero levels, according to an example embodiment.
Figure 6B:
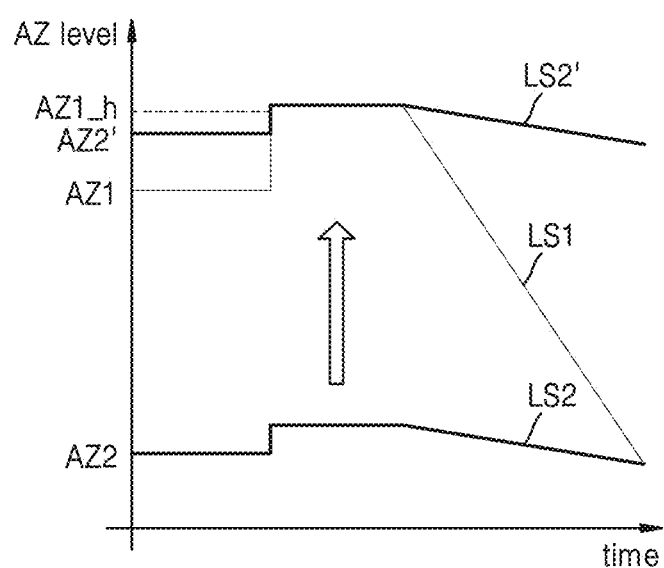
Figure 6C:
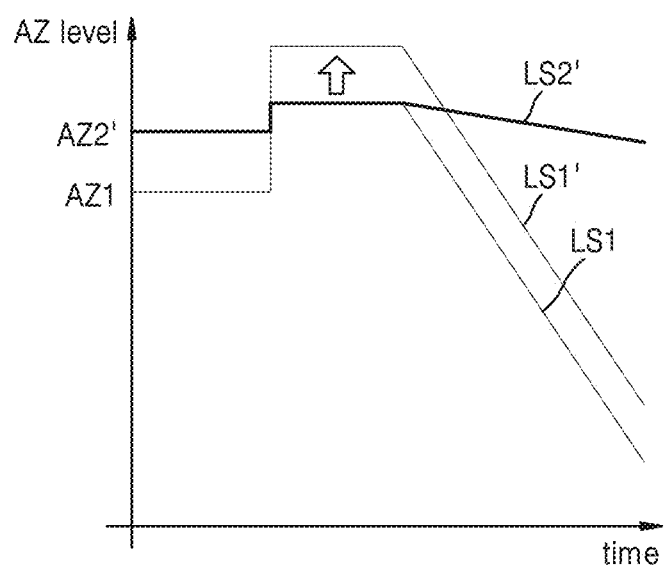

FIGS. 6A to 6C are graphs illustrating an example in which a ramp signal generator adjusts auto-zero levels according to an example embodiment.

Referring to FIG. 6A, a first ramp signal LS1 having a first gain and a second ramp signal LS2 having a second gain are illustrated. According to an example, an auto-zero level AZ1 of the first ramp signal LS1 having a first gain may be higher than an auto-zero level AZ2 of the second ramp signal LS2 having a second gain. According to an example, the first gain may be less than the second gain. According to an example, the first gain may be 1×, and the second gain may be 4×. According to an example embodiment of the inventive concepts, the auto-zero levels of ramp signals having different gains as described above may be adjusted to be equal to each other. Referring to the graph shown in FIG. 6A, when the gain of a CMOS image sensor (CIS) increases, the slope of ramp voltage decreases because the ramp voltage is generated by reducing current flowing through a resistor having constant resistance.

Referring to FIG. 6B, primary matching may be performed to by the timing controller 190 adjusting the second ramp signal LS2 having a relatively high gain to a maximum offset level AZ1_h (or alternatively, a highest offset level or a high offset level) of the first ramp signal LS1 having a relatively low gain. The primary matching may be performed by the timing controller 190 by varying the resistance of an offset resistor $R_{offset}$ as described with reference to FIGS. 4 and 5. Through the primary matching, the maximum level (or alternatively, a highest level or a high level) of the first ramp signal LS1 and the maximum level (or alternatively, a highest level or a high level) of a primarily-matched second ramp signal LS2' may be adjusted to be equal to each other. However, an auto-zero level AZ2' of the primarily-matched second ramp signal LS2' may be different from the auto-zero level AZ1 of the first ramp signal LS1.

Referring to FIG. 6C, secondary matching may be performed by the timing controller 190 to adjust the auto-zero level AZ2' of the primarily-matched second ramp signal LS2' and the auto-zero level AZ1 of the first ramp signal LS1 to be equal to each other by supplying current using the second current cell 1312a or 1312b shown in FIG. 4 or 5. Owing to the secondary matching, the auto-zero level AZ1 of the first ramp signal LS1 may be adjusted to be equal to the auto-zero level AZ2' of the primarily-matched second ramp signal LS2'. In the present disclosure, the term "secondary matching" may refer to matching the auto-zero level of a ramp signal having a relatively low gain to the auto-zero level of a ramp signal having a relatively high gain. The amount of current generated by the second current cell 1312a or 1312b for secondary matching will be described with reference to FIG. 7.

Figure 7:
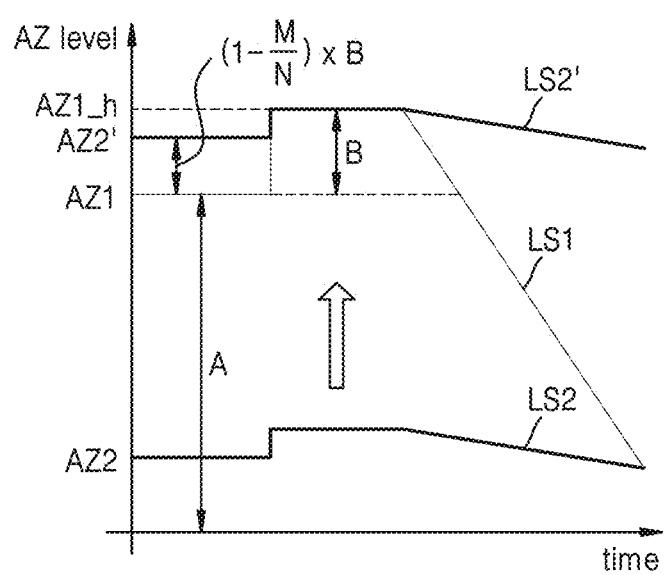
FIG. 7 is a diagram additionally illustrating the adjustment of auto-zero levels by the ramp signal generator.

FIG. 7 is a diagram additionally illustrating the adjustment of auto-zero levels by a ramp signal generator.

According to an example, a current value for maintaining the auto-zero level AZ1 of the first ramp signal LS1 having a relatively low gain may be A. This current value A may be provided by the first current cell 1311a or 1311b described with reference to FIG. 4 or 5. A current value for matching the auto-zero level AZ1 of the first ramp signal LS1 and the maximum level AZ1_h (or alternatively, a highest level or a high level) of the first ramp signal LS1 may be B. This current value B may be provided by a current cell for offset, that is, the third current cell 1313b described with reference to FIG. 5. In this case, a current value for removing the difference between the auto-zero level AZ1 of the first ramp signal LS1 and the auto-zero level AZ2' of the primarily-matched second ramp signal LS2' may be $$\left(1 - \frac{M}{N}\right) * B.$$

The current value $$\left(1 - \frac{M}{N}\right) * B$$

may be provided by the second current cell 1312b described with reference to FIG. 5.

When an analog gain is varied using the ramp signal generator of the inventive concepts, a settling time is not additionally required for auto-zeroing a sampling capacitor of a comparator to a varied DC level, and it is possible to implement the ramp signal generator and the comparator as a single unit instead of arranging the ramp signal generator and the comparator at two places. Owing to this, readout is possible while changing an analog gain within a 1H-period by using one ramp signal generator, thereby improving the efficiency of designs by fast readout and the use of a single ramp signal generator. In addition, readout modes, such as an overlapped staggered HDR mode and an intra-scene DCG mode, in which analog gain conversion is required (or alternatively, used) within a 1H-period or every 1H-period, may be realized using a single ramp signal generator. In addition, when the auto-zero levels of all analog gains are adjusted to be equal to each other, the gain linearity of the ramp signal generator may be improved.

Figure 8:
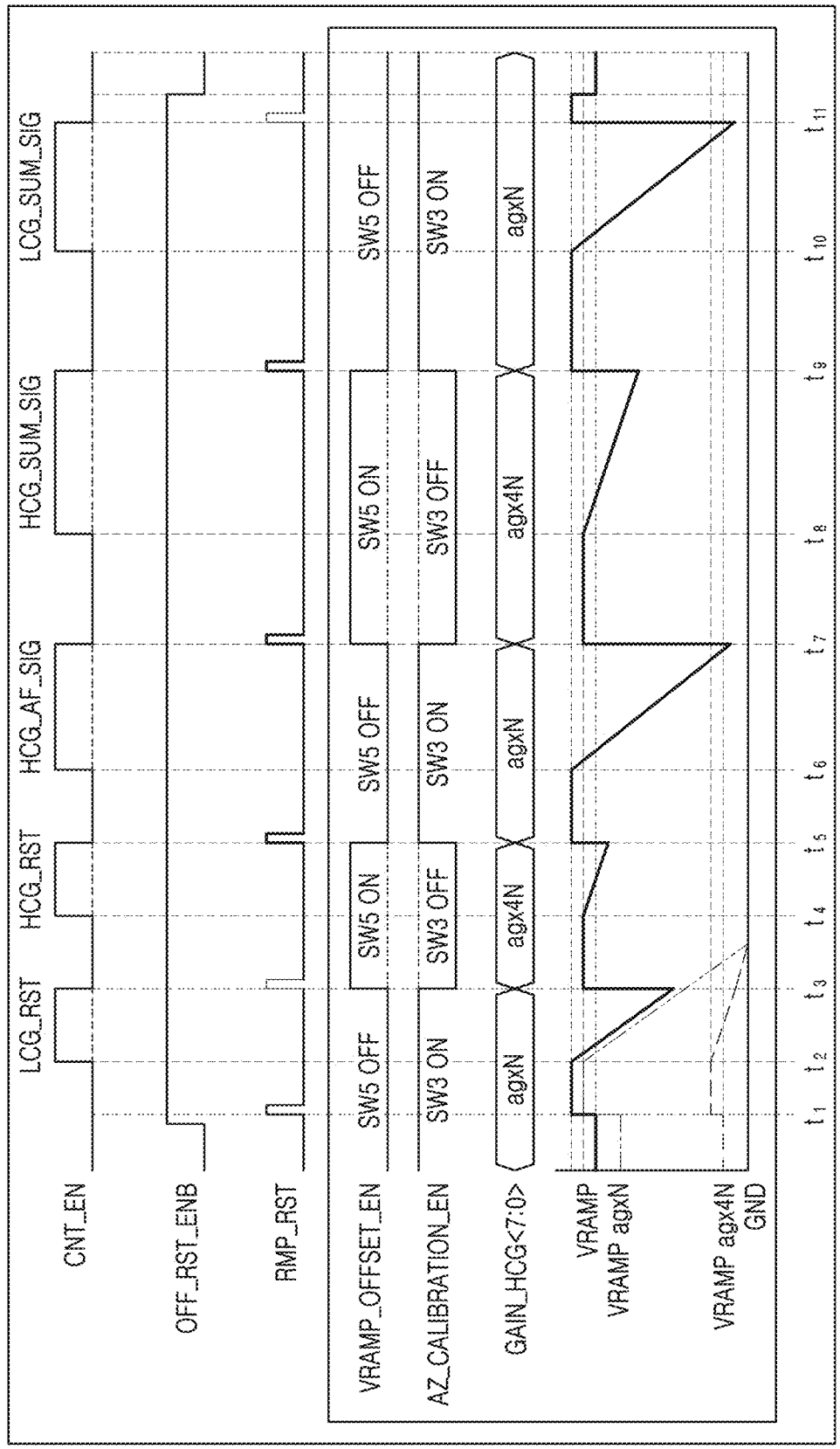
FIG. 8 is a timing diagram illustrating signals applied to the ramp signal generator shown in FIG. 4.

FIG. 8 is a timing diagram illustrating signals applied to the ramp signal generator 130a described with reference to FIG. 4. FIG. 8 may be a timing diagram illustrating a 1H-period of the ramp signal generator 130a shown in FIG. 4.

A count signal CNT_EN may be a signal that determines the start of a ramp signal. When the count signal CNT_EN transitions from a first level to a second level, a ramp signal having a predetermined (or alternatively, desired) slope may be applied. An offset reset signal OFF_RST_ENB may be a signal for adjusting the auto-zero level of a ramp signal. According to an example, the offset reset signal OFF_RST_ENB may be a signal for turning off as many current cells as necessary for a drop to an auto-zero level based on a maximum level (or alternatively, a highest level or a high level). A ramp reset signal RMP_RST may be a signal for adjusting a ramp signal to a maximum level (or alternatively, a highest level or a high level). According to an example, the ramp reset signal RMP_RST may be a signal for turning on all current cells. The ramp reset signal RMP_RST may have the highest priority. When the ramp reset signal RMP_RST transitions from a first level to a second level, a ramp signal for each gain may transition to a maximum level (or alternatively, a highest level or a high level). A resistance offset signal VRAMP_OFFSET_EN may be applied to the fifth switch SW5 shown in FIG. 4. An auto-zero calibration signal AZ_CALIBRATION_EN may be applied to the third switch SW3 shown in FIG. 4. A gain control signal GAIN<7:0> may be applied to the fourth switch SW4 shown in FIG. 4. A graph in a lower side of FIG. 8 shows the waveform of a ramp signal VRAMP at each timing, and, as references, the waveform of a signal VRAMP ag×N and the waveform of a signal VRAMP ag×4N. The signal VRAMP ag×N may be a signal having a gain of 1×. The signal VRAMP ag×4N may be a signal having a gain of 4×.

Referring to FIG. 8, at t1, the offset reset signal OFF_RST_ENB may maintain a second level, and the ramp reset signal RMP_RST may transition from the first level to the second level. At t1, the ramp signal VRAMP may transition to a maximum level (or alternatively, a highest level or a high level). In this case, the auto-zero calibration signal AZ_CALIBRATION_EN may be turned on, and thus, the third switch SW3 shown in FIG. 4 may be turned on. Owing to this, the second current cell 1312a may be connected for AZ calibration, thereby accomplishing an adjustment to an auto-zero level of a gain of 1×. In this case, an offset resistor may not be used.

At t2, ramping to an analog gain of 1× may be performed to count LCG reset levels. In this case, the count signal CNT_EN may transition from the first level to the second level. In this way, a ramp signal may be started.

Next, at t3, the count signal CNT_EN may transition from the second level to the first level, and the ramp reset signal RMP_RST may transition from the first level to the second level. As a result, the ramp signal may be stopped, and resetting of an auto-zero level may be started. In this case, the auto-zero calibration signal AZ_CALIBRATION_EN may be turned off, and thus, the third switch SW3 may be turned off. The resistance offset signal VRAMP_OFFSET_EN may be turned on, and thus, the fifth switch SW5 may be turned on. Owing to this, the auto-zero level may be primarily matched in a period from t3 to t5 in which a signal having an analog gain of 4× is applied.

At t4, the count signal CNT_EN may transition from the first level to the second level, and a ramp signal may be applied. The auto-zero calibration signal AZ_CALIBRATION_EN may be turned off, and the second current cell which is added for auto-zero calibration may be turned off, thereby transitioning to the current level of an existing ramp. In addition, the resistance offset signal VRAMP_OFFSET_EN, which is a signal for using the offset resistor, may be turned on such that an insufficient resistance level compared with a load resistance level for an analog gain of 1× may be supplemented using the offset resistor, thereby adjusting the auto-zero level of a ramp signal output for an analog grain of 1× and the auto-zero level of a ramp signal output for an analog gain of 4× to be equal to each other.

Next, at t5, the count signal CNT_EN may transition from the second level to the first level, and the ramp reset signal RMP_RST may transition from the first level to the second level. In this case, signal control may be performed in a period in which a signal for an analog gain of 1× is applied, that is, a period from t5 to t7, in the same manner as in a period from t1 to t3

Thereafter, signal control may be performed in a period from t7 to 19 in the same manner as in the period from t3 to t5, and signal control may be performed in a period from t9 to t11 in the same manner as in the period from t1 to t3. Analog gain conversion for counting HCG and LCG signal levels may be changed in the same manner as in the previous reset level counting method, and through this, a readout mode for freely changing an analog gain within a 1H-period may be implemented with one ramp signal generator.

Referring to FIG. 8, the same auto-zero level may be maintained in each (or alternatively, at least one) of periods ag×N for an analog gain of 1× and periods ag×4N for an analog gain of 4×.

Figure 9:
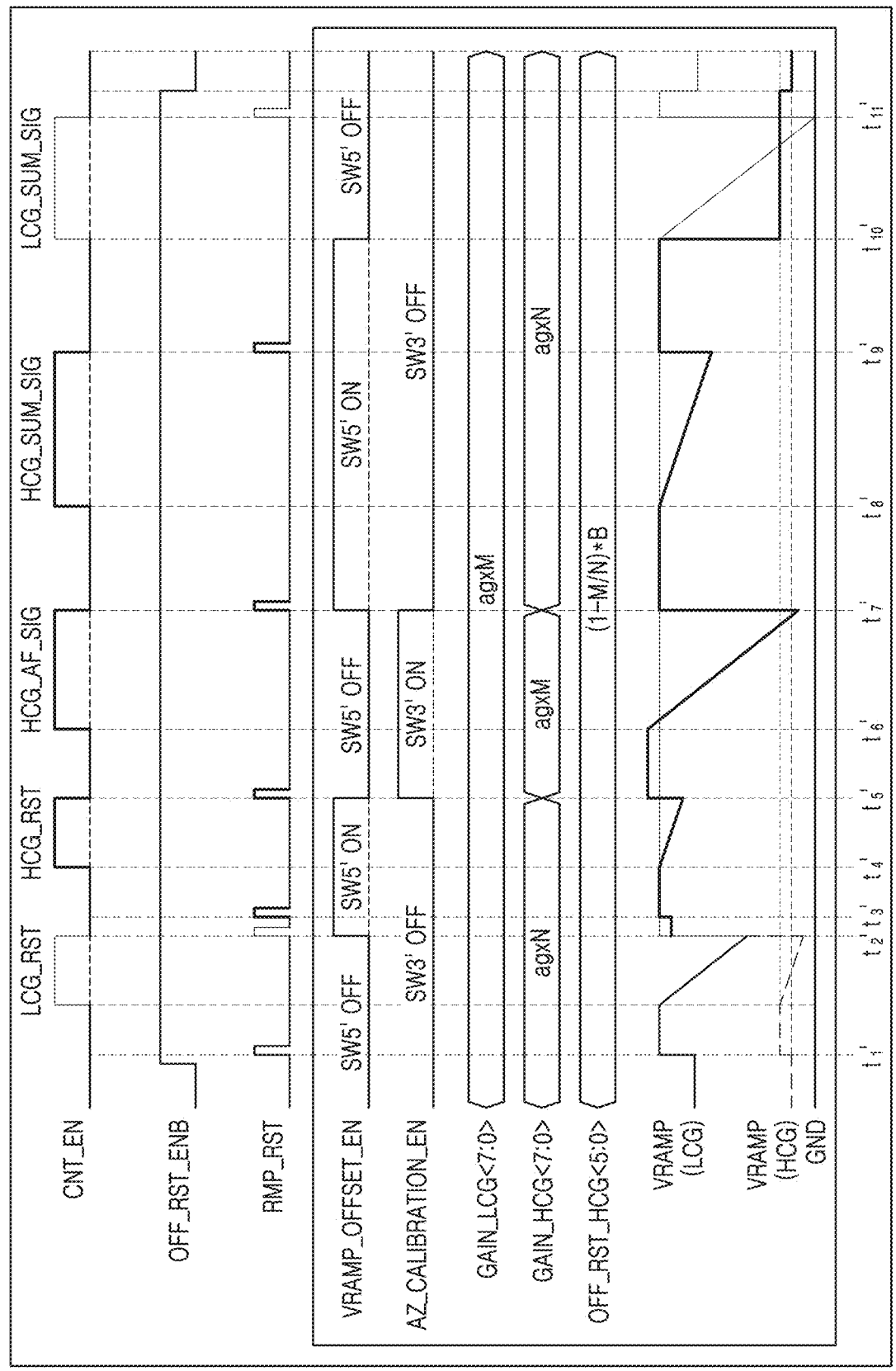
FIG. 9 is a timing diagram illustrating signals applied to the ramp signal generator shown in FIG. 5.

FIG. 9 is a timing diagram illustrating signals applied to the ramp signal generator 130b shown in FIG. 5. In the following description of the example embodiment of FIG. 9, those described with reference to FIG. 8 will not be described again.

According to an example, a signal VRAMP(LCG) having a low gain corresponding to an LCG mode, and a signal VRAMP(HCG) having a high gain corresponding to an HCG mode are shown.

A resistance offset signal VRAMP_OFFSET_EN and an LCG control signal GAIN_LCG<7:0> may be applied to the fifth switch SW5'. An auto-zero calibration signal AZ_CALIBRATION_EN and a first offset reset signal OFF_RST_HCG<5:0> may be applied to the third switch SW3'. An HCG control signal GAIN_HCG<7:0> may be applied to the fourth switch SW4' to adjust a gain value. In FIG. 9, N may refer to a high gain value (multiple), and M may refer to a low gain value (multiple).

At t1', an offset reset signal OFF_RST_ENB maintains a second level, and a ramp reset signal RMP_RST may transition from a first level to a second level. In this case, both the resistance offset signal VRAMP_OFFSET_EN and the auto-zero calibration signal AZ_CALIBRATION_EN may be turned off.

At t2', a count signal CNT_EN may transition from a second level to a first level, and the ramp reset signal RMP_RST may transition from the first level to the second level. In this case, the resistance offset signal VRAMP_OFFSET_EN may be turned on, and thus, the fifth switch SW5' may be turned on. At t3', the ramp reset signal RMP_RST may transition from the first level to the second level, and thus, the signal VRAMP(HCG) corresponding to the HCG mode may be primarily matched to a maximum level (or alternatively, a highest level or a high level) of the signal VRAMP(LCG) corresponding to the LCG mode.

At t4', the count signal CNT_EN may transition from the first level to the second level, and a ramp signal may start. At t5', the count signal CNT_EN may transition from the second level to the first level, and the ramp reset signal RMP_RST may transition from the first level to the second level. In this case, the resistance offset signal VRAMP_OFFSET_EN may be turned off, and the auto-zero calibration signal AZ_CALIBRATION_EN may be turned on. Through this, a current value of (1−M/N)*B may be additionally applied, and thus, the auto-zero level of a ramp signal having a gain of M may be secondarily matched. In the remaining periods, this auto-zero level matching may be repeated.

For a structure in which 2PD intra-scene DCG and dual slope gain (DSG) are combined together, an analog gain of 4× may be used as an HCG, and an analog gain of 1× may be used as an LCG. In this case, a left HCG may need (or alternatively, use) an analog gain of 1× to prevent or hinder early saturation of an LCG Auto Focusing. However, in case of transition to an analog gain of 1× after ramping to an analog gain of 4×, the full range of received light may not be covered, and thus a ramp signal generator having the same auto-zero level at all gains is required or desired. When an offset resistor and a current cell unit are configured to adjust auto-zero levels to be equal to each other as described in the previous example embodiments, the inventive concepts may expand to a 2PD intra-scene DCG mode system using a dual ramp DSG.

Figure 10A:
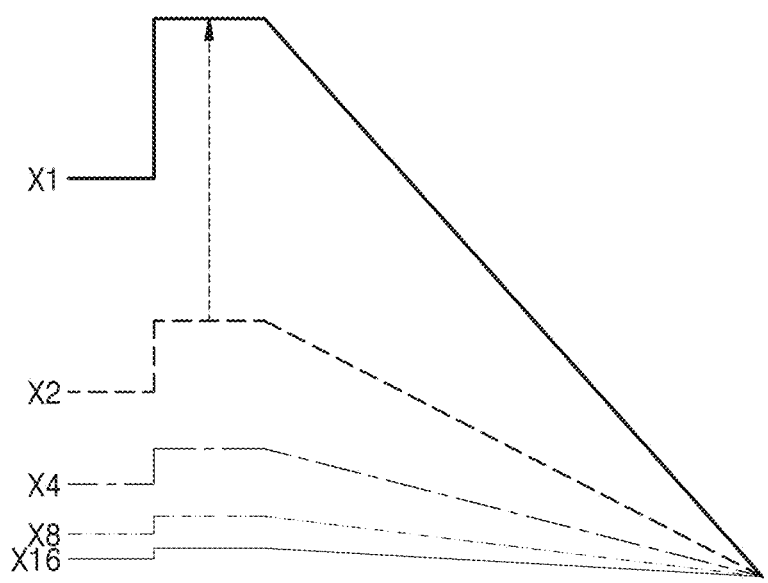
FIGS. 10A to 10C are graphs illustrating an example in which auto-zero levels are adjusted by a ramp signal generator according to an example embodiment.
Figure 10B:
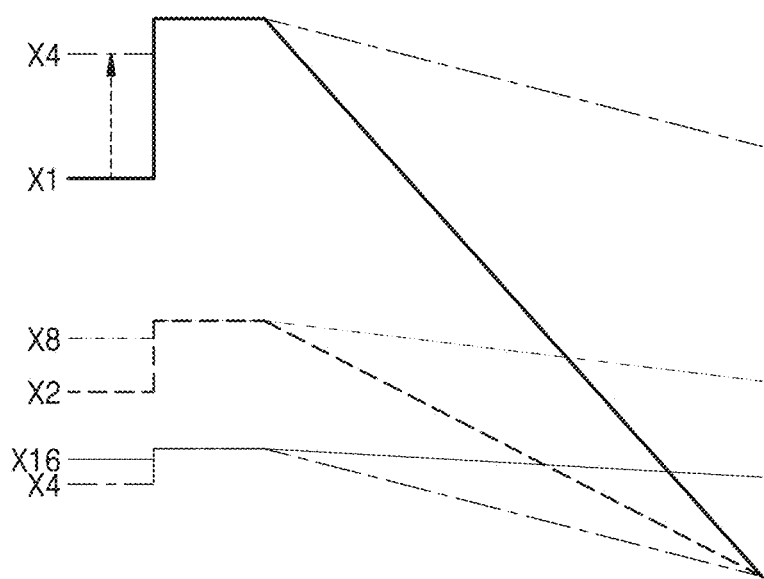
Figure 10C:
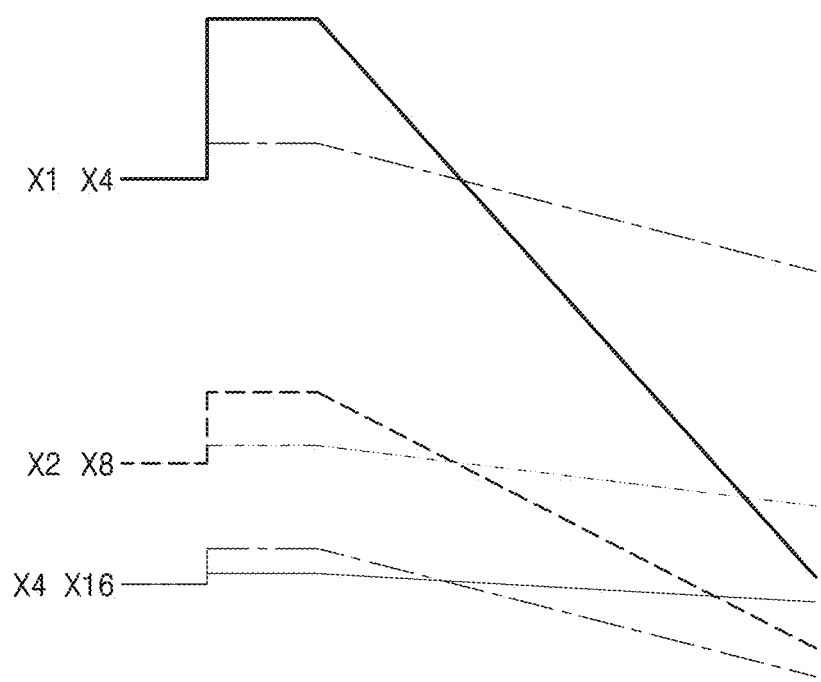

FIGS. 10A to 10C are graphs illustrating an example of adjusting auto-zero levels by a ramp signal generator according to an example embodiment. In the following descriptions of FIGS. 10A to 10C, those described with reference to FIGS. 6A to 6C may not be described again.

Referring to FIG. 10A, ramp signals for various gain values are shown. Referring to FIG. 10A, a ramp signal X1 for a gain of 1×, a ramp signal X2 for a gain of 2×, a ramp signal X4 for a gain of 4×, and a ramp signal X8 for a gain of 8×, a ramp signal X16 for a gain of 16× are shown.

FIGS. 10B and 10C show that the auto-zero levels of ramp signals may be adjusted to be equal to each other for all the cases in which the difference between analog gains is 4×. First, FIG. 10B shows an example in which the output of a ramp signal having a high analog gain is adjusted to a maximum level (or alternatively, a highest level or a high level) of a ramp signal having a low analog gain by using an offset resistor. Thereafter, the auto-zero level of the ramp signal having a low analog gain is adjusted to be equal to the auto-zero level of the ramp signal having a high analog gain using the offset resistor by operating additional auto-zero-calibration current cells In this manner, the inventive concepts may be applied to analog gains different from each other by a factor of 2×, 4×, 8×, and 16× to adjust auto-zero levels to be equal to each other for all the analog gain conditions.

Figure 11:
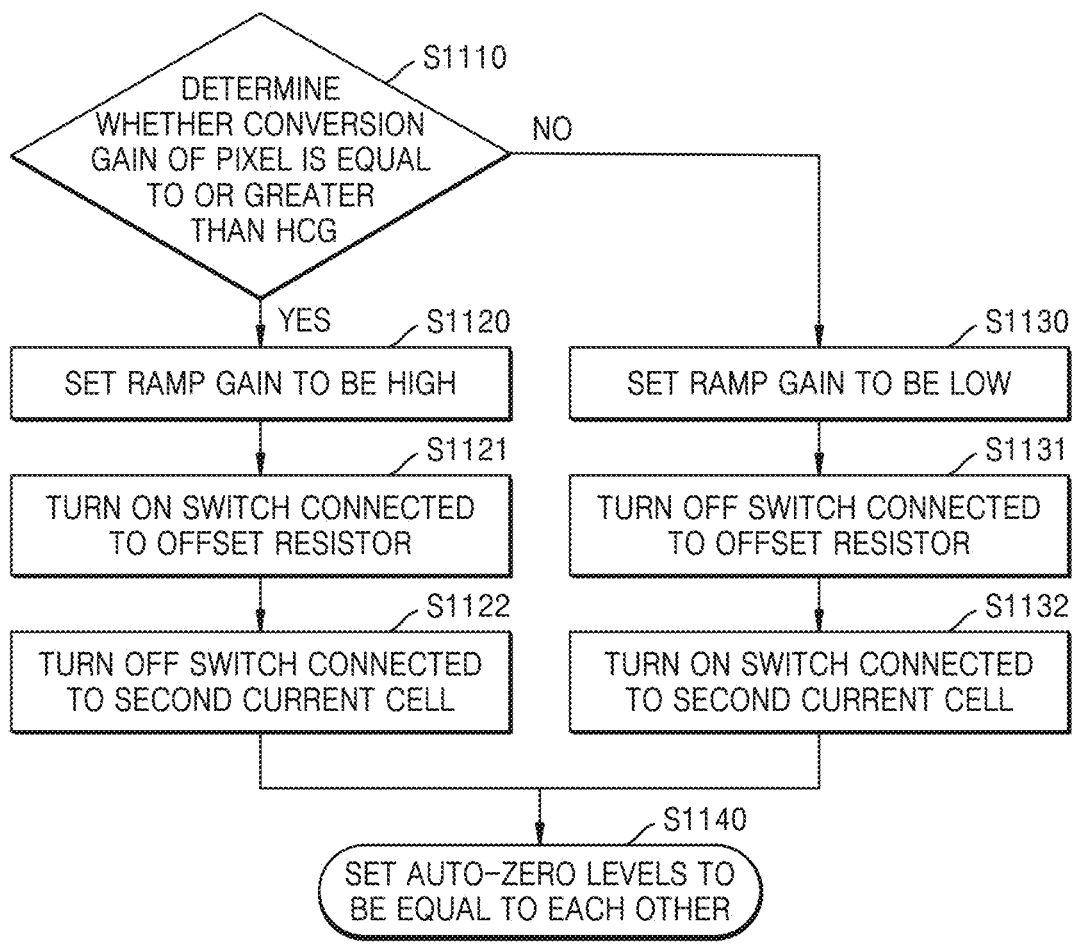
FIG. 11 is a flowchart illustrating a method of adjusting auto-zero levels, according to an example embodiment.

FIG. 11 is a flowchart illustrating a method of adjusting auto-zero levels according to some example embodiments.

Referring to FIG. 11, it may be determined whether a conversion gain of a pixel included in a pixel array is equal to or greater than a set HCG (S1110). When the conversion gain of the pixel is equal to or greater than the set HCG (yes), it may indicate an HCG mode, and in this case, an analog gain of a ramp signal generator may be set to be high (S1120).

When the analog gain of the ramp signal generator is set to be high (S1120), a switch connected to an offset resistor may be turned on (S1121), and a switch connected to a second current cell may be turned off (S1122). This may be for matching the level of a ramp signal having a high analog gain to the level of a ramp signal having a low analog gain.

When the conversion gain of the pixel is less than the set HCG, it may indicate an LCG mode, and in this case, the analog gain of the ramp signal generator may be set to be low (S1130).

When the analog gain of the ramp signal generator is set to be low (S1130), the switch connected to the offset resistor may be turned off (S1131), and the switch connected to the second current cell may be turned on (S1132). This may be for matching the level of a ramp signal having a low analog gain to the level of a ramp signal having a high analog gain.

In this manner, the auto-zero levels of ramp signals having different gains and output from the ramp signal generator may all be adjusted to be equal to each other (S1140).

To support fast readout and HDR functions for high-performance image sensor designs, it is expected that modes in which multiple ramp signals are used at the same time will gradually increase. Currently, a readout mode enabling different analog gains is implemented with two ramps. However, a plurality of analog gains such as analog gains of 1×, 2×, 4×, 8×, and 16× may be implemented within one 1H-period or one frame by using a small number of ramps to support precise HDR functions with fast readout.

According to the ramp signal generator of the inventive concepts, settings of analog gains may be changed within one 1H-period or one frame without an auto-zeroing settling time of an additional CDS operational transconductance amplifier (OTA). In addition, 14 bits may be supported by 2PD intra-scene DCG and DSG.

Any of the elements and/or functional blocks disclosed above may include or be implemented in processing circuitry such as hardware including logic circuits; a hardware/software combination such as a processor executing software; or a combination thereof. For example, the timing controller 190 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the inventive concepts have been particularly shown and described with reference to example embodiments thereof, it will be understood that various changes in form and details may be made therein without departing from the spirit and scope of the following claims.

What is claimed is:

1. An image sensor comprising:
a pixel array comprising a plurality of pixels;
a ramp signal generator configured to generate ramp signals having different auto-zero levels, according to conversion gain modes of the pixel array; and
an analog-to-digital conversion circuit configured to output a comparison signal by comparing a ramp signal with a signal output from the pixel array,
wherein the ramp signal generator is configured to generate
a first ramp signal having a first auto-zero level based on a first gain, and
a second ramp signal having a second auto-zero level based on a second gain, and
wherein the ramp signal generator is configured to adjust the first auto-zero level of the first ramp signal and the second auto-zero level of the second ramp signal to be equal to each other.

2. The image sensor of claim 1, wherein the ramp signal generator is configured to perform primary matching on the first ramp signal to match a highest level of the first ramp signal to a highest level of the second ramp signal.

3. The image sensor of claim 2, wherein the ramp signal generator is configured to perform secondary matching on the second ramp signal to match the second auto-zero level of the second ramp signal to an auto-zero level of the primarily-matched first ramp signal.

4. The image sensor of claim 2, further comprising:
a timing controller,
wherein the ramp signal generator comprises, a current cell unit comprising a plurality of current sources configured to generate current signals; and
a resistance unit connected to an output terminal of the current cell unit,
wherein the resistance unit comprises
a load resistor;
an offset resistor connected to an output terminal of the load resistor and having a resistance based on analog gains; and
a second switch connected between a ground terminal and the offset resistor, and
wherein the timing controller is configured to perform the primary matching by varying the resistance of the offset resistor and turning on the second switch.

5. The image sensor of claim 3, further comprising:
a timing controller,
wherein the ramp signal generator comprises
a current cell unit comprising a first current cell comprising a plurality of current sources configured to generate current signals, a second current cell connected in parallel with the first current cell and comprising a plurality of current sources configured to generate current signals, and a first switch connected to the plurality of current sources of the second current cell and an output terminal of the second current cell, and
a resistance unit connected to an output terminal of the current cell unit,
wherein the resistance unit comprises
a load resistor, and
an offset resistor connected to an output terminal of the load resistor and having a resistance based on analog gains, and
wherein the timing controller is configured to perform the secondary matching by turning on the first switch.

6. The image sensor of claim 3, further comprising a timing controller configured to control timing of signals to be applied to the ramp signal generator and the pixel array.

7. The image sensor of claim 6, wherein, the timing controller is configured to, for the primary matching, control a signal to be applied for varying a resistance of an offset resistor of the ramp signal generator and a signal to be applied to a second switch connected to the offset resistor, and
for the secondary matching, control a signal to be applied to a first switch connected to a current source of the ramp signal generator.

8. The image sensor of claim 7, wherein, the timing controller is configured to, for the primary matching, turn on the signal to be applied to the second switch and turn off the first switch, and
for the secondary matching, turn off the signal to be applied to the second switch and turn on the first switch.

* * * * *